June 27, 1939.  V. W. KLIESRATH  2,163,883
GEAR SHIFTING MECHANISM
Filed March 29, 1934   3 Sheets-Sheet 1
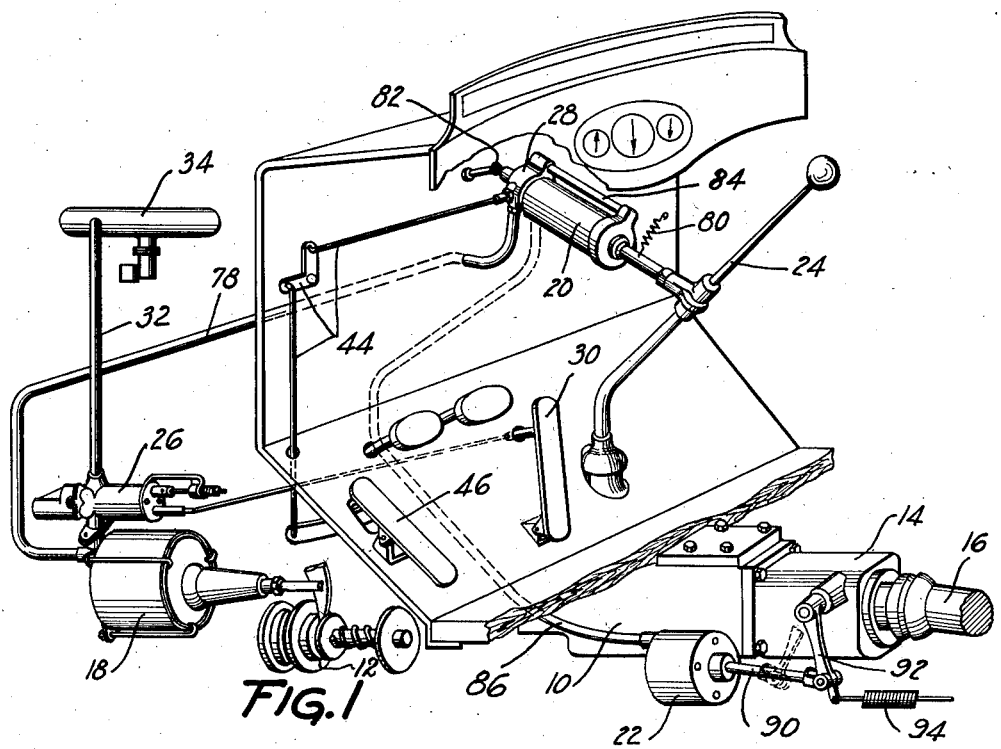
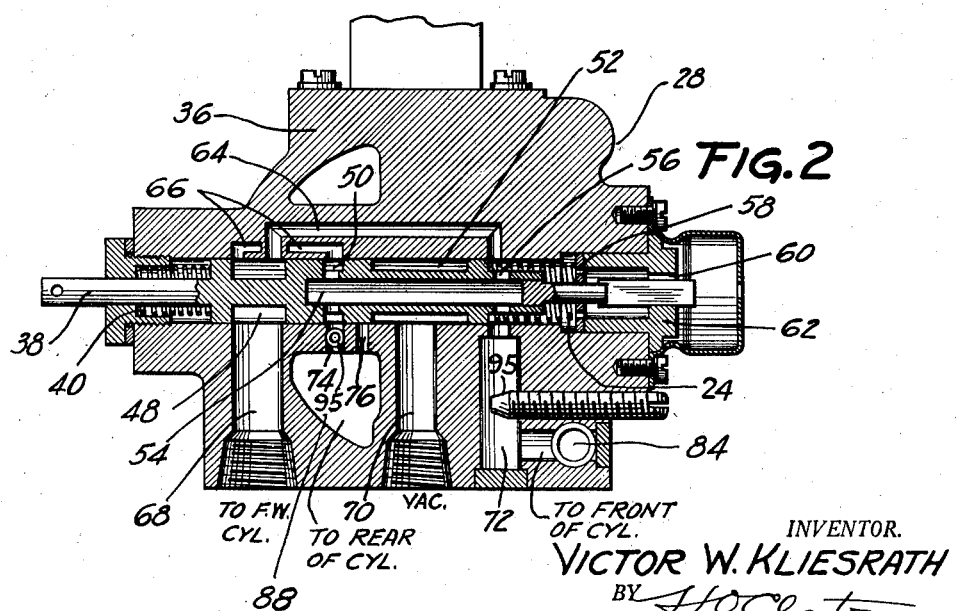
INVENTOR.
VICTOR W. KLIESRATH
BY
ATTORNEY June 27, 1939.  V. W. KLIESRATH  2,163,883
GEAR SHIFTING MECHANISM
Filed March 29, 1934   3 Sheets-Sheet 2

INVENTOR.
VICTOR W. KLIESRATH
BY
ATTORNEY

Patented June 27, 1939

2,163,883

UNITED STATES PATENT OFFICE 2,163,883

GEAR SHIFTING MECHANISM

Victor W. Kliesrath, South Bend, Ind., assignor to Bendix Aviation Corporation, South Bend, Ind., a corporation of Delaware Application March 29, 1934, Serial No. 717,935

11 Claims. (Cl. 192—.01)

This invention relates in general to the power plant of an automotive vehicle, and more particularly to means facilitating the operation of the conventional change-speed transmission.

It is desirable that the transmission be isolated prior to the gear selecting operation, for by so doing the driving connections between the propeller shaft and the gear box and between the engine and gear box are interrupted, thus facilitating the meshing of the gears.

It is also desirable to minimize the number and complexity of the controls of the transmission and to be able to operate said controls with a minimum of physical effort.

To the above end there is suggested a structure comprising separate clutches positioned ahead of and behind the transmission, both of the clutches and the shifting mechanism of the transmission being power operated in such a manner that the transmission is isolated prior to a gear shifting operation.

The invention also contemplates the provision of clutch mechanism interposed between the transmission and the propeller shaft, said clutch being normally operative to provide a positive or bidirectional driving connection between the two, but which is automatically operative to provide a unidirectional drive immediately prior to the operation of the power gear shifting mechanism to disconnect the transmission from the shaft.

Another feature of the invention lies in the combination of a power means for operating the conventional clutch, a separate power means for operating the transmission and a free-wheeling clutch interposed in the driving connection between the transmission and the propeller shaft.

Yet another feature of the invention resides in the provision of a pressure differential operated motor for rendering a free-wheeling unit operative as a uni-directional drive mechanism, the motor being interlocked in parallel with a similar motor for operating the shifting mechanism of the transmission, both motors being in part controlled by a common valve unit.

There is also provided interlocked fluid power mechanism for operating the conventional clutch, the transmission and a free-wheeling unit wherein an accelerator operated master valve controls the flow of power fluid for energizing and deenergizing a motor operably connected to the clutch and, together with a selector valve, controlling the fluid for energizing and deenergizing the aforementioned free-wheeling and transmission operated motors, the latter being in parallel with each other in the fluid circuit.

Other objects of the invention and desirable details of construction and combinations of parts will become apparent from the following description of a preferred embodiment, which description is taken in conjunction with the accompanying drawings, in which:

Figure 1 is a diagrammatic view illustrating, in combination, the principal elements of the invention;

Figure 2 is a sectional view of the valve unit for controlling the operation of the pressure differential operated motors for operating the transmission and free-wheeling unit;

Figure 4:
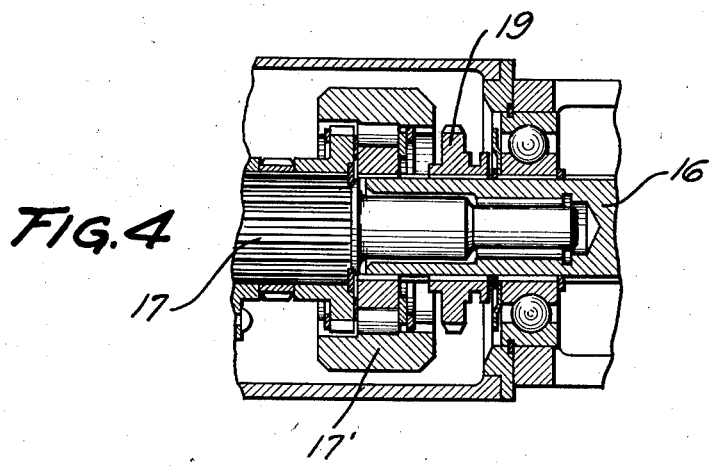
Figure 4 is a sectional view of a conventional free-wheeling unit and lock-out therefor.

In that embodiment of the invention selected for illustration there is diagrammatically disclosed in Figure 1 a conventional three-speed forward and reverse transmission 10 adapted to be connected to the internal-combustion engine of the vehicle, not shown, by a conventional friction clutch diagrammatically shown at 12, a conventional free-wheeling unit 14 being interposed between the transmission and a drive shaft 16 immediately to the rear of the transmission. Briefly described, the unit 14, disclosed in Figure 4, comprises a driving shaft 17 and the driven or propeller shaft 16. An overrunning clutch 17', which may be of the Horton type, is drivably connected to the shaft 17 and is selectively connected with the shaft 16 by means of a gear 19 slidably keyed to the shaft 16. The gear 19 is arranged to be alternately operated by spring and power means respectively to cut out and cut in the free-wheeling unit. When cut out, the gear 19 is moved to the left, Figure 4, to interlock the same with the overrunning clutch, thus rendering the clutch inoperative and providing a bidirectional drive between the driven and driving shafts 16 and 17 respectively. When the free-wheeling unit is cut in, preferably by the aforementioned power means to be described hereinafter, the gear 19 is moved to the right, Figure 4, thus rendering the overrunning clutch operative by providing a unidirectional drive between the shafts 16 and 17.

The invention in its broadest aspect is directed to the provision of power means for operating the clutch, transmission and free-wheeling units to facilitate the operation of the transmission. To this end there are provided three separate pressure differential operated motors 18, 20 and 22, operably connected respectively to the clutch 12, the shift lever 24 of the transmission and the free-wheeling unit 14, two valve units 26 and 28 being provided to control the operations of the three motor units.

Figure 3:
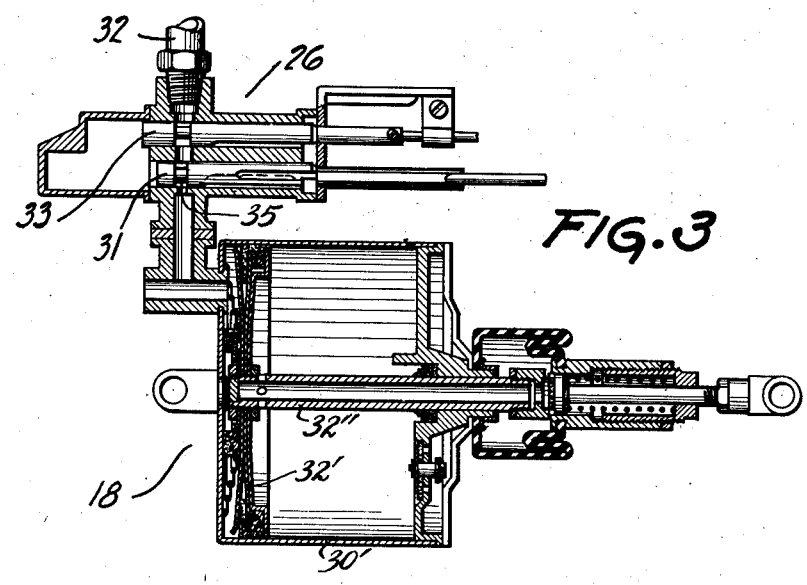
Figure 3 is a sectional view disclosing the details of the clutch operating motor unit and control valve therefor.

The motor 18, together with its three-way and cut-out control valve unit 26, which may be termed a master valve, constitutes the invention of Victor W. Kliesrath covered by application Serial No. 721,683, filed April 21, 1934. Briefly describing said motor and valve unit, disclosed in Figure 3, upon release of a throttle controlling accelerator 30, a valve 31 is operated to interconnect, via a conduit 32 and a slot 35 in the valve, the manifold 34 as a source of suction with the motor 18, thus energizing the same and disengaging the clutch. The motor preferably comprises a cylinder 30' and a piston 32', the latter being connected by means of a rod 32'' with the clutch. Upon depressing the accelerator to open the throttle, the valve 31 is again operated to vent the motor 18, deenergizing the same to effect a movement of the piston 32', resulting in an engagement of the clutch. If desired, a manually operated three-way type of cut-out valve 33 may be incorporated in the fluid connection to the manifold.

Figure 5:
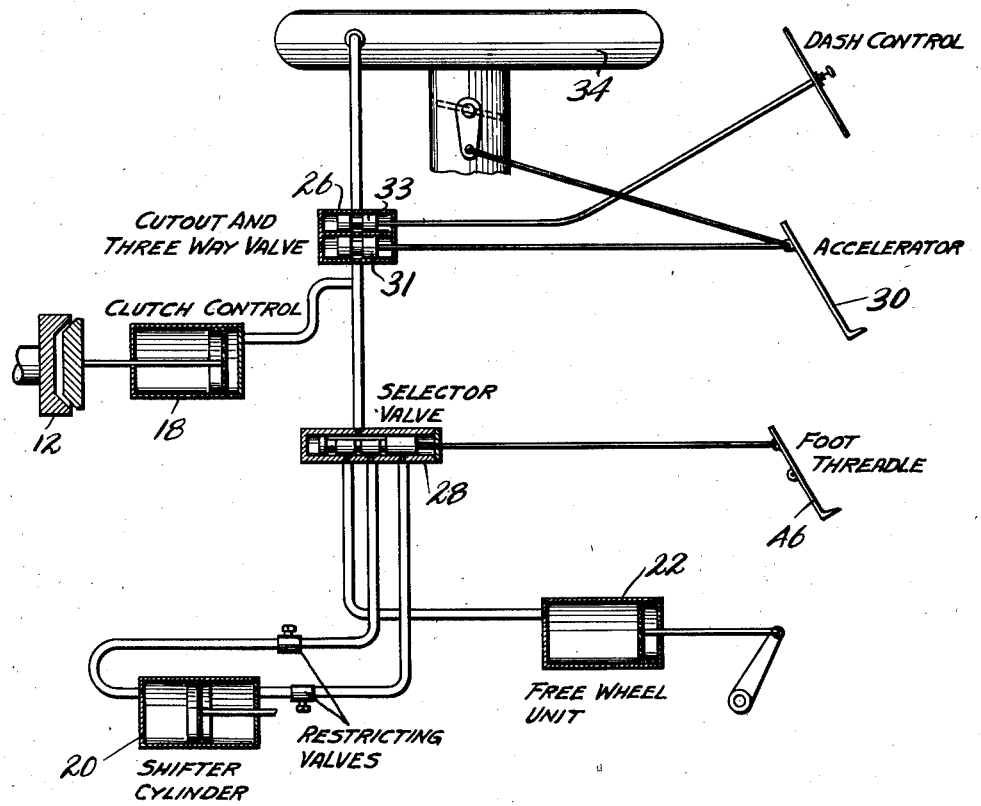
Figure 5 is a schematic view of the invention, disclosing in particular the arrangement of the valve and motor elements of the invention incorporated in the several fluid transmitting circuits.

The invention is particularly concerned with the motors 20 and 22 in parallel with the clutch motor 18, said motors 18, 20 and 22 being operative to first disengage the clutch 12 and render the free-wheeling unit operative to provide a unidirectional drive and then to actuate the transmission to effect a gear shift. As indicated by Figure 5 of the drawings, the clutch motor 18 is incorporated in a fluid line which is in parallel with a line including the motors 20 and 22, the latter motors being in parallel with each other.

The control valve 28, disclosed in detail in Figure 2, constitutes one of the principal elements of the invention and comprises a casing 36 bored to receive a reciprocable plunger 38 normally maintained in the position disclosed in the figure by return springs 40 and 42 and operably connected by linkage 44 to a manually operated treadle 46. The plunger 38 is recessed at 48, 50 and 52 and is further provided with a bore 54 and with ports 56, the latter interconnecting the bore 54 with the atmosphere via ports 58 and 60 in a plug member 62. The valve casing 36 is provided with ducts 64, 66, 68, 70, 72, 74 and 76.

Describing now the operation of the mechanism, when it is desired to shift gears, the accelerator 30 is first released, thus making possible an operation of the power mechanism for operating the transmission and free-wheeling unit; this for the reason that the three-way valve 31 is incorporated in the fluid transmitting connection between the manifold and a conduit 78, the latter being connected to conduit 32 below the valve 26 and leading to the transmission operating motor 20. This feature of the inventiton is not claimed herein, being more fully described and claimed in an application of Victor W. Kliesratch and Roy S. Sanford, No. 580,434, filed December 11, 1931.

Should the vehicle be at a standstill and a low gear selection of the transmission be desired, the operator moves the gear shift lever 24 to the left in the conventional manner through the gate of the transmission and against the action of a return spring 80. The motor 20 is preferably universally mounted at 82 to the dash of the vehicle, all as is more fully described and claimed in an application of Victor W. Kliesrath et al., No. 686,720, filed August 25, 1933.

The treadle is now depressed by the heel of the operator, moving the plunger 38 to the right, Figure 2, to cut off the atmospheric vent to the free-wheeling motor 22 and a front chamber of the motor 20 and interconnecting these parts with the manifold, said chamber being connected to the manifold via duct 70, recess 52, duct 72 and a tube 84, and the free-wheeling motor 22 being connected to the manifold via duct 70, recess 52, duct 64, recess 48, duct 68 and a conduit 86, Figure 1. The rear chamber of the motor 20 remains vented to the atmosphere via a chamber 88 in the valve casing, duct 76, recess 50, bore 54 and ducts 56, 58 and 60. The motors 20 and 22 are thus energized to render the free-wheeling unit operative as a uni-directional drive mechanism and move the shift lever 24 to its low gear position. The motor 22 acts through the intermediary of a connecting rod 90 upon a free-wheel operating crank arm 92, the latter being normally moved, by a spring 94, to lock out the free-wheeling unit, that is render the same operative as a bidirectional drive unit. The shape an size of the aforementioned air transmitting passages are preferably such that the motor 22 is energized to render the free-wheeling unit 14 operative as a unidirectional drive before the motor 20 is energized to actuate the shift lever 24; this for the reason that in subsequent operations with the vehicle in motion it is preferable to disengage the transmission from the drive shaft to isolate the transmission before the gears are shifted. Such an isolation is effected, inasmuch as the clutch 12 is always automatically disengaged when the motor is running and the accelerator is released. Accordingly, it follows from the above that when the treadle 46 is operated prior to a release of the accelerator, constituting a preselecting operation, then the clutch 12 and free-wheeling unit are simultaneously or substantially simultaneously operated to isolate the transmission prior to an operation of the transmission by the motor 20. On the other hand, if the treadle 46 is operated after the accelerator is released, the clutch 12, free-wheeling unit 14 and transmission are successively operated in the order named. The energization of the motor 22 prior to the motor 20 may also be accomplished by the incorporation of restricting valves 95 placed in the fluid transmitting connections to the front and rear compartments of the motor 22, as disclosed in Figure 2 of the drawings.

After the gear change is effected, the treadle is released, thus again venting both ends of the motor 20 and the motor 22, deenergizing the same and again locking out the free-wheeling unit by means of the spring 94. The shift lever, however, remains in its operative position, whereupon the accelerator is depressed to open the throttle and deenergize the clutch motor 18, thereby engaging the clutch and accelerating the vehicle.

In order to shift into second gear the treadle 46 is depressed by the toe of the operator, moving valve member 38 to the left, Figure 2, to cut off the connections between the duct 66 and the recess 50 and between the duct 64 and recess 48 and interconnect the recess 52, leading to the manifold, with the ducts 66 and 76. The recess 48 is at all times in connection with the duct 68, the latter being interconnected with the free-wheel operating motor 22 by the conduit 86. The motor 22 is thus again connected to the manifold to energize the same and again cut in the operation of the free-wheeling unit 14. The rear chamber of the motor 22 is, with this operation of the valve, also connected with the manifold, the front chamber being connected with the atmosphere via ports 58 and 60, ducts 72 and tube 84. The motor 20 is thus again energized to move the shift lever into its second gear position, the spring 80 serving to aid this movement by moving the lever through the gate in the transmission, after the lever is moved out of its low gear position. The spring 80 thus serves to bias the lever 24 to a position in the so-called second and high gear channel of the transmission. The shift into high gear may now be effected, the operating being similar to that effecting the low or first gear operation of the transmission except that the gear shift lever is moved entirely by power means without any necessity for partial manipulation by the operator.

There is thus provided a compact and effective manually controlled vacuum operated power mechanism for operating both the transmission and clutches ahead of and behind the transmission, the clutches in their disengaged positions facilitating the operation of the transmission. Both of the clutches are operative prior to the operation of the transmission, and the free-wheeling clutch is only rendered operable as a unidirectional drive mechanism during the gear shifting operation, thus limiting its function to the shifting of gears, there being no conventional free-wheeling or coasting effect of the vehicle upon release of the accelerator.

While one illustrative embodiment has been described, it is not my intention to limit the scope of the invention to that particular embodiment, or otherwise than by the terms of the appended claims.

I claim:

1. The combination with separate clutches ahead of and to the rear of the variable gear transmission of an automotive vehicle, of power means for operating both of the clutches and the transmission to facilitate the gear shifting operation, said power means comprising a separate pressure differential operated motor for operating each of the clutches and a third pressure differential operated motor for operating the transmission, and further comprising a single valve means for in part controlling the operation of all of said motors.

2. The combination with a throttle, manually operated means for operation of the throttle and separate clutches ahead of and to the rear of the variable gear transmission of an automotive vehicle, of power means for operating both of the clutches and the transmission to facilitate the gear shifting operation, said power means comprising a separate pressure differential operated motor for operating each of the clutches and a third pressure differential operated motor for operating the transmission, and a master valve operable by the afore-mentioned manually operated means, for in part controlling the operation of said power means.

3. An automotive vehicle provided with an internal-combustion engine having an intake manifold, a change-speed transmission, a drive shaft, a clutch interconnecting the engine and transmission, and a clutch interconnecting the transmission and drive shaft and comprising, in combination therewith, manifold vacuum operated power means for operating both of the clutches and the transmission to facilitate the gear shifting operation, said power means comprising a pressure differential operated motor for operating the first mentioned clutch, a separate pressure differential operated motor for operating the second mentioned clutch and yet another motor for operating the transmission, said last two motors being controlled by a single manually operable selector valve.

4. An automotive vehicle provided with a change-speed transmission, a drive shaft, a clutch interconnecting the engine and transmission, and a clutch interconnecting the transmission and drive shaft and comprising, in combination therewith, power means for operating both of the clutches and the transmission to facilitate the gear shifting operation, said power means comprising a motor for operating the first mentioned clutch and two motors, together being in parallel with the first-mentioned motor and in parallel with each other, for operating the second mentioned clutch and transmission.

5. In an automotive vehicle provided with a variable-speed transmission, a propeller shaft and a free-wheeling unit interposed between said transmission and shaft, means for normally rendering said free-wheeling unit operative as a bidirectional drive element, and power means for operating the transmission and rendering said unit operative as a unidirectional drive element, said power means comprising two separate pressure differential operated motors, one connected to the transmission and the other to the free-wheeling unit and arranged in parallel with each other in the fluid circuit for controlling the same, the power means further comprising a common valve means for controlling the operation of said motors.

6. An automotive vehicle provided with a transmission and separate clutches ahead of and to the rear of the transmission and comprising, in combination therewith, power means for successively operating first the forward clutch, then the rearward clutch and then the transmission incident to the operation of the transmission, said power means including a plurality of fluid motors, and fluid transmitting means so interlocking said motors as to insure the aforementioned sequence of operations.

7. An automotive vehicle provided with a transmission and separate clutches ahead of and to the rear of the transmission and comprising, in combination therewith, power means for successively operating first the forward clutch, then the rearward clutch and then the transmission incident to the operation of the transmission, said power means comprising separate single-acting motors for operating each of said clutches and a double-acting motor for operating the transmission, and further comprising fluid transmitting means so interlocking said motors as to insure the aforementioned sequential operation of said clutches and transmission.

8. An automotive vehicle provided with a three-speed forward and reverse transmission, a propeller shaft and a free-wheeling unit interposed in the connection between the transmission and shaft and comprising, in combination therewith, means for normally rendering the free-wheeling unit operative to insure a positive driving connection between the transmission and shaft, power means for rendering the free-wheeling unit operative as a uni-directional drive mechanism, power means for operating the transmission, and common valve means for controlling the operation of both power means.

9. An automotive vehicle provided with a variable-speed transmission, a propeller shaft and a free-wheeling unit incorporated in the driving connection between the transmission and shaft and comprising, in combination therewith, means normally rendering the free-wheeling unit operative to insure a positive driving connection between the transmission and shaft, power means for rendering the free-wheeling unit operative as a uni-directional drive mechanism comprising a single-acting pressure differential operated motor, power means for operating the transmission comprising a double-acting pressure differential operated motor, and common valve means for controlling the operation of both power means.

10. A valve mechanism for jointly controlling the operations of a double-acting and double-ended motor and a single-acting motor comprising a casing ported to provide fluid transmitting connections with each end compartment of the double-ended motor both with a source of fluid pressure and with the atmosphere, and further comprising a spring returned reciprocable non-rotatable piston valve member operable in a neutral off position to deenergize both of said motors, and further operable in either of the extreme positions to which it is moved to energize both of said motors.

11. In an automotive vehicle provided with a source of fluid power, a variable speed transmission, a free-wheeling unit and a clutch, three separate fluid operated motors, one for each of the aforementioned units and operatively connected thereto, a master valve for controlling all three of said motors, and a valve for controlling the first two mentioned units together with fluid transmitting connections interconnecting said power source, valve and motors.

VICTOR W. KLIESRATH.